United States Patent [19]

Masubuchi et al.

[11] 3,989,920
[45] Nov. 2, 1976

[54] UNDERWATER STUD WELDING GUN

[75] Inventors: Koichi Masubuchi, Arlington, Mass.;
Muneharu Kutsuna, Takarazuka, Japan

[73] Assignee: Massachusetts Institute of Technology, Cambridge, Mass.

[22] Filed: May 15, 1975

[21] Appl. No.: 577,582

[52] U.S. Cl. .................... 219/98; 61/69 A; 219/72; 219/99
[51] Int. Cl.² ............... B23K 9/20; B23K 11/04
[58] Field of Search ............ 61/69 R, 69 A; 219/74, 219/72, 98, 99

[56] References Cited
UNITED STATES PATENTS

| | | | |
|---|---|---|---|
| 1,865,663 | 7/1932 | White | 61/69 A |
| 2,315,502 | 4/1943 | Crecca et al. | 219/98 |

*Primary Examiner*—J. V. Truhe
*Assistant Examiner*—N. D. Herkamp
*Attorney, Agent, or Firm*—Arthur A. Smith, Jr.; Martin M. Santa; Robert Shaw

[57] ABSTRACT

A conventional stud-welding gun has been modified to allow it to be used for welding under water. The stud is contained within a water-tight enclosure formed at the end of the gun by pressing the seal at the end against the object to which the stud is to be welded. A water pump evacuates the enclosure and a stream of inert gas is provided to expel water and dry the region where the weld is to occur.

3 Claims, 1 Drawing Figure

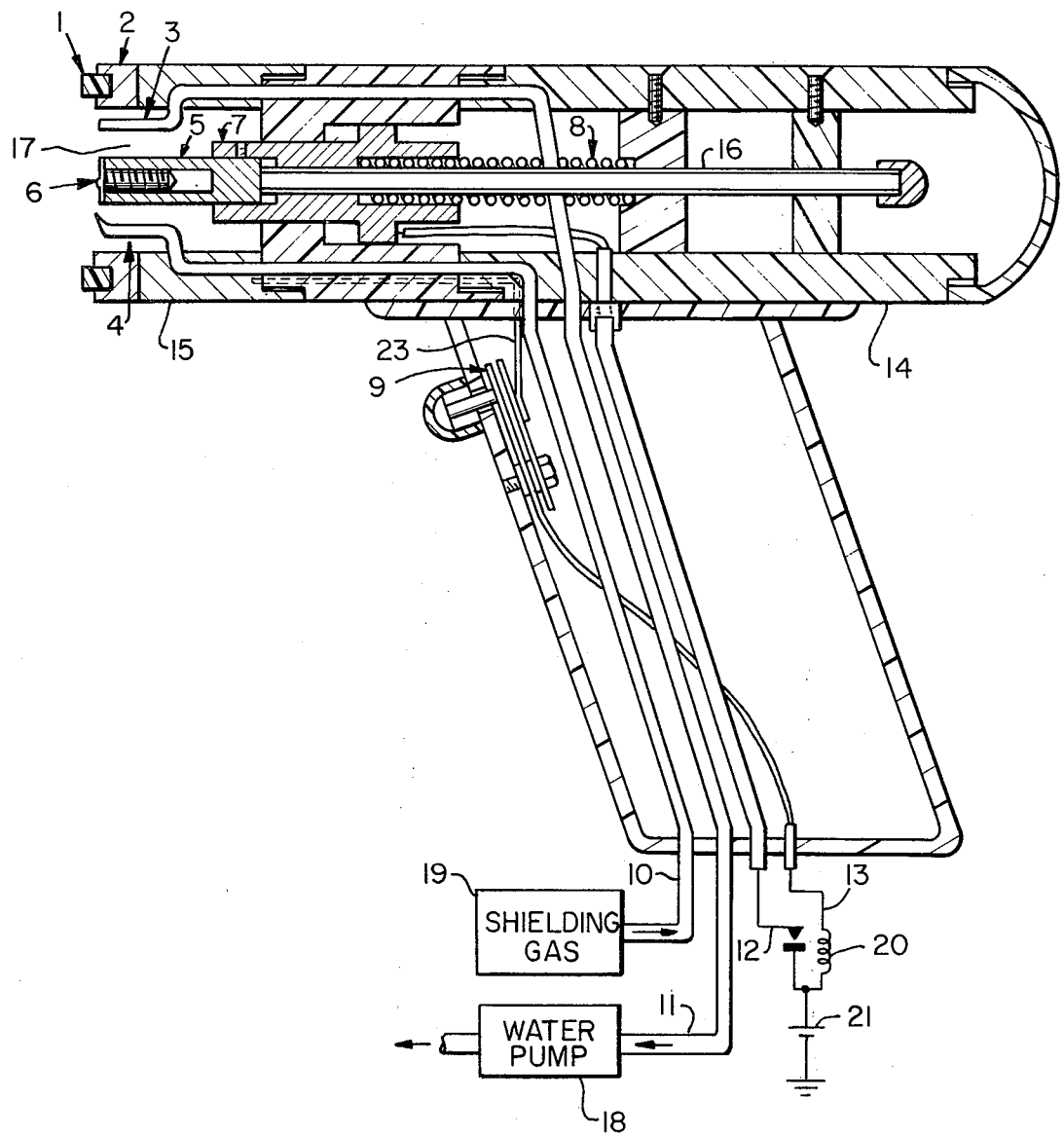

UNDERWATER STUD WELDING GUN

The Government has rights in this invention pursuant to Sea Grant No. 04-4-158 awarded by the National Oceanic and Atmospheric Administration in the U.S. Department of Commerce.

The general purpose of this invention is to provide a stud-welding device which can be used quickly and safely under water to join metals by means of a local pumping system with appropriate sealing materials and a clamping magnet.

The former underwater joining processes are classified as dry chamber underwater arc welding processes and wet underwater arc welding processes. These methods, however, cannot be used to join metals in the deep sea. Furthermore, the properties of welds obtained in shallow sea are not always sound. For instance, in wet underwater welding processes used at the depth that a diver can go down, the moisture surrounding the arc goes into the weld to stay and a brittleness of weldments occur.

On the other hand, in the prior-art dry chamber underwater welding processes, a large chamber is sunk; and high pressure argon or helium gas is used to obtain a dry space under the water. In this way a good weldment is obtained because the water near the point to be welded is removed. However, this facility is not feasible for use in the deep sea, because a man must dive into the dry chamber to weld. Moreover, there is no satisfactory sealing system.

It is therefore an object of the present invention to provide a new, small underwater stud-welding gun as shown in the FIGURE. By means of this gun, the inventors have made it possible to pump out the water near the welded point and to dry up the welded surface by fitting a gas nozzle near the welding chip.

With the invention of the new underwater stud-welding gun, a new technique for welding a bolt within one minute has been developed for use at deep sea levels (up to a depth of approximately 5,000 feet). This new underwater stud-welding gun can be affixed to the manipulator of very deep marine vehicles thus making possible the welding of metals at deep sea level.

The FIGURE shows a cross-sectional view of the welding gun of this invention.

DETAILED DESCRIPTION OF THE INVENTION

The preferred embodiment of the invention utilizes a modified form of a conventional stud-welding gun, as for example, a "Nelson" stud-welder. The conventional stud-welder comprises a housing 14 of plastic or similar electrically-insulating, impact-resistant material having at one end a hollow, metallic cylinder 15. The stud 6 to be welded to a plate (not shown) is slidably contained within metallic tip 5. The tip 5 is mounted in metallic tip holder 7 which is attached to guide rod 16. Spring 8 mounted along rod 16 provides a compression force on stud 6 when the stud 6 is pressed against the surface to which it is to be welded.

The cylindrical end 15 has been modified to include a cylindrical magnet 2 attached to it in order to provide a magnetic attraction force to the metal to which the stud 6 is to be welded. A resilient sealing material, such as rubber, synthetic rubber or deformable plastic, is inserted in a cylindrical groove in the magnet 2. The stud 6 extends out of the enclosure or cavity 17 formed by magnet 2 and end 15 before spring 8 is compressed. The FIGURE shows stud 6 in the position that it will be in when welding takes place. The mechanical contact of magnet 2 with the sheet to be welded provides a stop which determines the maximum movement of the stud 6 and thereby the maximum compression of spring 8. The seal 1 is compressed to provide a watertight chamber 17 when the stud 6 is pressed against the sheet.

A nozzle 3 contained in chamber 17 drains water from the sealed enclosure 17 through the action of water pump 18 to which it is connected by tube 11. A nozzle 4 has its open end located in proximity to the end of stud 6, when stud 6 is in the position shown in the FIGURE. A shielding gas, of argon or similar inert gas, provided by source 19, flows through tube 10 and nozzle 4 to expel any water from the space between the welding surface of stud 6 and the sheet to which it is to be welded and to dry this space.

Welding is accomplished as in the conventional stud-welding gun by closing switch 9 of wire 13. This switch 9 activates a control circuit, shown as relay 20, by energizing the coil of the relay 20 through an electrical power source 21. The high-current-capacity contacts of relay 20 provide the welding current from source 21 through wire 12 to stud 6. The sheet to which the stud is to be welded is connected to the ground terminal of power source 21. Switch 9, as shown, is connected to the metallic cylindrical end 15 and magnet 4 by wire 23. Therefore, the magnet 2 must be in electrical contact with the sheet to be welded before the relay 20 can be activated and thus provides a safety feature.

Although the preferred embodiment of the invention has employed a magnet 2 to assist the operator in holding the end of the gun in contact with the sheet to be welded, it is apparent that the magnet 2 is not absolutely necessary. If magnet 2 is not used, the cylinder 15 would be longitudinally extended so that it occupied the region of the magnet 2. Other variations of this invention will be apparent to those skilled in the art without departing from the scope of this invention.

What is claimed is:
1. An underwater stud-welding gun comprising
   a stud-welding gun having a cylindrical end enclosure containing a stud-holding tip,
   a resilient sealing member attached to the end of said cylindrical enclosure and extending along the circumference of said cylindrical enclosure,
   means for removing water from said cylindrical enclosure when said sealing member is pressed against a welding surface thereby forming a watertight sealed cylindrical enclosure,
   means for providing a flow of inert gas in the space between the end of the stud-holding tip and said surface to remove any remaining water from said space.
2. The stud-welding gun of claim 1, comprising, in addition,
   a magnetic member attached to the end of said cylindrical enclosure to provide an attraction force between said cylindrical enclosure and said welding surface, said force acting to compress said sealing member and thereby assist in providing the sealing of said cylindrical enclosure.
3. The apparatus of claim 1 wherein said inert gas is argon.

* * * * *